(12) United States Patent
Schmidt et al.

(10) Patent No.: US 7,337,273 B2
(45) Date of Patent: Feb. 26, 2008

(54) STRATEGIES FOR READING INFORMATION FROM A MASS STORAGE MEDIUM USING A CACHE MEMORY

(75) Inventors: Brian L. Schmidt, Bellevue, WA (US); Jonathan E. Lange, Bellevue, WA (US); Timothy R. Osborne, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 212 days.

(21) Appl. No.: 10/817,308

(22) Filed: Mar. 31, 2004

(65) Prior Publication Data

US 2005/0223165 A1  Oct. 6, 2005

(51) Int. Cl.
*G06F 12/06* (2006.01)

(52) U.S. Cl. .................. 711/129; 711/173; 711/172; 711/171; 711/130

(58) Field of Classification Search ............ 711/118, 711/119, 129, 130, 173, 171, 172, 145, 144
See application file for complete search history.

(56) References Cited

U.S. PATENT DOCUMENTS

| 5,787,472 | A |   | 7/1998  | Dan et al. |
|-----------|---|---|---------|------------|
| 5,940,838 | A |   | 8/1999  | Schmuck et al. |
| 6,122,708 | A | * | 9/2000  | Faraboschi et al. ......... 711/118 |
| 6,421,761 | B1 |  | 7/2002  | Arimilli et al. |
| 6,425,057 | B1 | * | 7/2002 | Cherkasova et al. ........ 711/134 |
| 6,468,160 | B2 |  | 10/2002 | Eliott |
| 6,560,681 | B1 | * | 5/2003 | Wilson et al. ............... 711/144 |
| 6,570,885 | B1 |  | 5/2003  | Gregg |
| 6,712,704 | B2 |  | 3/2004  | Eliott |
| 6,769,989 | B2 |  | 8/2004  | Smith et al. |
| 2002/0135585 | A1 | * | 9/2002 | Dye et al. .................... 345/531 |
| 2003/0041214 | A1 | * | 2/2003 | Hirao et al. ................. 711/137 |
| 2003/0109313 | A1 | * | 6/2003 | Gavin .......................... 463/43 |
| 2004/0162137 | A1 |  | 8/2004  | Eliott |
| 2005/0066063 | A1 | * | 3/2005 | Grigorovitch et al. ......... 710/1 |
| 2005/0166006 | A1 | * | 7/2005 | Talbot et al. ................ 711/105 |

FOREIGN PATENT DOCUMENTS

JP        2001203995 A   *  7/2001

OTHER PUBLICATIONS

Wu, Kun-Lung, Yu, Philip S., and Wolf, Joel L., "Segment-Based Proxy Caching of Multimedia Streams," Int'l. World Wide Web Conference, Hong Kong, May 2001, Proceedings of the 10th Int'l Conference on World Wide Web, pp. 36-44.

* cited by examiner

*Primary Examiner*—Pierre-Michel Bataille
(74) *Attorney, Agent, or Firm*—Lee & Hayes, PLLC

(57) ABSTRACT

Cache management strategies are described for retrieving information from a storage medium, such as an optical disc, using a cache memory including multiple cache segments. A first group of cache segments can be devoted to handling the streaming transfer of a first type of information, and a second group of cache segments can be devoted to handling the bulk transfer of a second type of information. A host system can provide hinting information that identifies which group of cache segments that a particular read request targets. A circular wrap-around fill strategy can be used to iteratively supply new information to the cache segments upon cache hits by performing pre-fetching. Various eviction algorithms can be used to select a cache segment for flushing and refilling upon a cache miss, such as a least recently used (LRU) algorithm or a least frequently used (LFU) algorithm.

20 Claims, 9 Drawing Sheets

STRATEGIES FOR READING INFORMATION FROM A MASS STORAGE MEDIUM USING A CACHE MEMORY

TECHNICAL FIELD

This subject matter relates to strategies for reading information from a storage medium using a cache memory, and, in a more particular implementation, to strategies for reading information from an optical mass storage medium using a cache memory.

BACKGROUND

Host systems conventionally use a cache memory when reading information from an optical or magnetic mass storage medium. In this approach, a drive mechanism reads the information from the storage medium and stores it in the cache memory. If the host system requests a block of information that is already stored in the cache memory, then the host system will pull this information from the cache memory rather than the physical storage medium. This event is referred to as a cache hit. If information is not stored in the cache memory, then the host system is forced to retrieve the information from the storage medium itself. This event is referred to a cache miss. Generally, a requested piece of information can be retrieved from cache memory faster than it can be retrieved from the physical storage medium—this being the primary benefit of the use of cache memories.

FIG. 1 shows a depiction of a conventional cache memory 102. A conventional cache memory 102 comprises a portion of high speed memory (e.g., RAM). Cache management logic (not shown) uses one or more pointers (e.g., pointer 104) to identify locations within the cache memory 102 for storing and retrieving information.

FIG. 2 shows a conventional procedure 200 for retrieving information from a storage medium. The procedure 200 particularly pertains to a conventional technique for retrieving media information (such as music or movies) from an optical storage medium. Conventional optical storage media include compact discs (CDs), digital versatile discs (DVDs), etc. In step 202, an optical drive mechanism receives a request from a host system (such as a computer system or dedicated player device) for specific information. The host system may specifically identify a particular block of media information for presentation at an output device (such as a display device and/or speakers). In step 204, the drive mechanism determines whether the requested block of information is present in the cache memory 102. If so, in step 206, the drive mechanism will retrieve the information from the cache memory 102 and forward it to the host system.

In step 208, if the requested information is not in the cache memory 102, the drive mechanism will read the information from the storage medium itself (e.g., the actual CD disc or DVD disc). The drive mechanism will then supply this information to the host system. The drive mechanism may also flush the cache memory 102 and store the recently retrieved information (obtained from the storage medium) in the cache memory 102. Further, the drive mechanism may also read ahead to retrieve a series of additional contiguous blocks from the storage medium that follow the requested block of information, and then store these additional blocks in the cache memory 102. As a result, if the host system subsequently requests the next contiguous block of information stored on the storage medium, then the drive mechanism can retrieve this block of information from the cache memory 102, as opposed to the storage medium. Step 210 indicates that this procedure 200 is repeated throughout the playback of the media information until the host system terminates the procedure 200. The use of the read-ahead technique reduces the drive mechanism's required interaction with the storage medium.

The above-described cache memory retrieval scheme works well for the kinds of media information mentioned above, namely music and movies. In these cases, the playback pattern is predictably linear, meaning that a consumer will typically play this media information from start to finish. While there may be some deviation from this pattern, as when the consumer jumps back or ahead to a different point in the media information, these deviations are relatively infrequent, and thus do not noticeably affect the performance of the drive mechanism. On the hand, other applications do not accommodate this kind of linear and predictable playback of information. Consider, for instance, the case of a storage medium (e.g., a DVD-ROM) that provides game information. The game information may include: information that defines the characters and other objects used to compose scenes; information that defines the audio presentation of the game (e.g., various voice clips and sound effects); information that governs various game engines, and so on. A game developer will attempt to optimize game performance by arranging blocks of information that are likely to be requested close together in time during play into a group of related files, and then storing such group of related files close to each other on the storage medium. However, even with this provision, game play proceeds in a basically open-ended and unpredictable fashion. Depending on the actions taken by the player, which are largely unpredictable, the drive mechanism may have to pull from different parts of the storage medium in quick succession. This kind of reading behavior will cause frequent cache misses, and consequently, will cause frequent flushing and refilling of the cache memory 102. Such behavior can negatively impact the performance of the game.

There is accordingly an exemplary need for more efficient strategies for reading information from a storage medium using a cache memory, particularly for those information consumption environments that do not exhibit linear and predictable playback of information.

SUMMARY

According to one exemplary implementation, a method is described for reading information from an optical storage medium. The method includes providing a cache memory having multiple cache segments. The method further includes receiving a request for information stored on the optical storage medium, and determining whether the requested information is stored in one of the cache segments. The method includes retrieving the requested information from the above-mentioned one of the cache segments if the information is determined to be stored in the cache memory, and retrieving the requested information from the optical storage medium itself if the information is determined not to be stored in the cache memory.

According to another exemplary implementation, the above-mentioned retrieved information pertains to a game application.

According to another exemplary implementation, the cache memory includes a first group of at least one cache segment dedicated to handling a first type of information and a second group of at least one cache segment dedicated to handling a second type of information. The first type of information pertains to information that is designated for retrieval in a streaming transfer mode, and the second type of information pertains to information that is designated for retrieval in a bulk transfer mode. More specifically, in one application, the first type of information pertains to audio game information, and the second type of information pertains to game level load information.

According to another exemplary implementation, the above-mentioned determining of whether the requested information is stored in one of the cache segments includes determining whether the requested information is stored in a cache segment identified in hint information received from a host system.

According to another exemplary implementation, when the requested information is retrieved from the above-mentioned at least one cache segment, the method further comprises moving a pointer associated with the above-mentioned at least one cache segment ahead to define free cache space, pre-fetching information from the optical storage medium, and then filling the pre-fetched information into the free cache space of the above-mentioned at least one cache segment. The pre-fetching can be performed at a time in which a drive mechanism is not otherwise engaged performing other tasks. Further, the above-mentioned filling proceeds in a circular manner by wrapping around from an end of the above-mentioned at least one cache segment to a beginning of the above-mentioned at least one cache segment.

According to another exemplary implementation, when the requested information is retrieved from the optical storage medium, the method further comprises determining which one of the cache segments should receive the requested information based on an eviction algorithm, flushing the determined cache segment of its current contents, and then storing the information retrieved from the optical storage medium in the determined cache segment. In one case, the eviction algorithm determines the cache segment to receive the requested information by identifying the cache segment which has been least recently used. In another case, the eviction algorithm determines the cache segment to receive the requested information by identifying the cache segment which has been least frequently used.

Additional implementations and features will be described in the following.

Figures 1, 2:
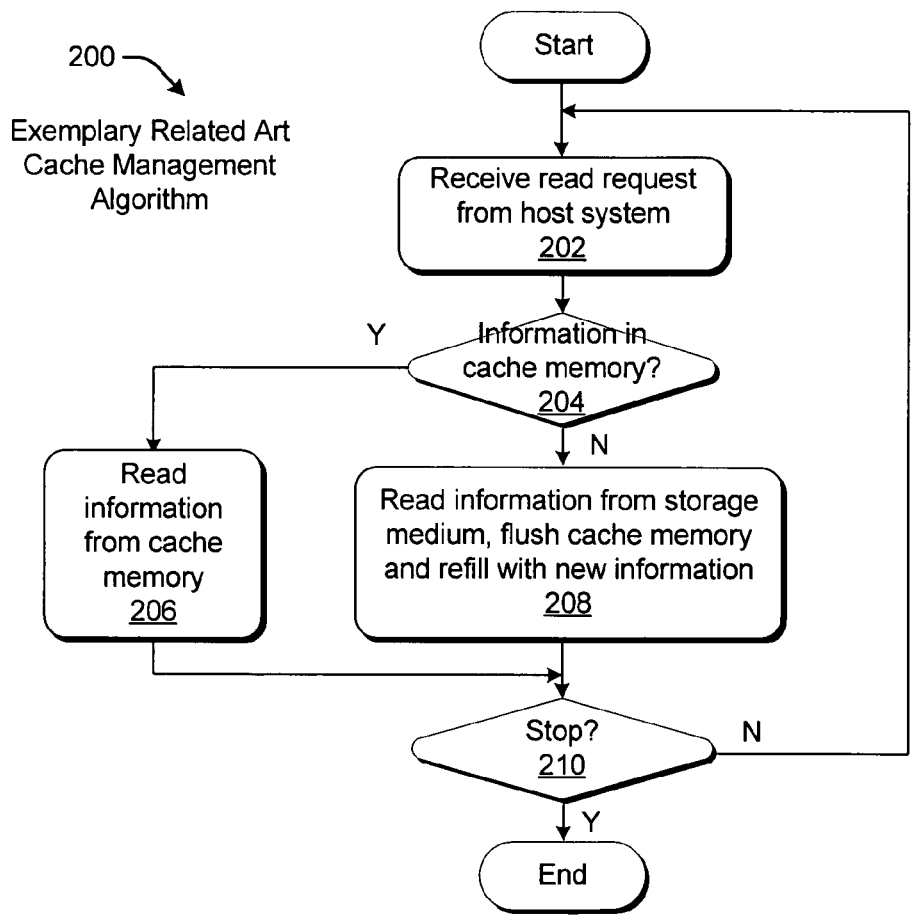
FIG. 1 shows a depiction of a conventional cache memory.
FIG. 2 shows a conventional procedure for reading information from a storage medium using the cache memory shown in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Strategies are described herein for reading information from a mass storage medium using a segmented cache memory. This disclosure includes: a) Section A which describes an exemplary system that utilizes a segmented cache memory; b) Section B which describes exemplary procedures for managing the segmented cache memory and for reading information using the segmented cache memory; and c) Section C which describes exemplary applications of the segmented cache memory.

In general, any of the functions described herein can be implemented using software, and/or firmware (e.g., fixed logic circuitry). The term "functionality," "logic" or "module" as used herein generally represents software, firmware, or a combination of software and firmware. For instance, in the case of a software implementation, the term "functionality," "logic" or "module" represents program code that performs specified tasks when executed on a processing device or devices (e.g., CPU or CPUs). The program code can be stored in one or more computer readable memory devices. The illustrated separation of functionality, logic and modules into distinct units may reflect an actual physical grouping and allocation of such software and/or hardware, or can correspond to a conceptual allocation of different tasks performed by a single software program and/or hardware unit. The illustrated functionality, logic and modules can be located at a single site (e.g., as implemented by a single processing device), or can be distributed over plural locations.

A. EXEMPLARY SYSTEM

Overview of System

Figure 3:
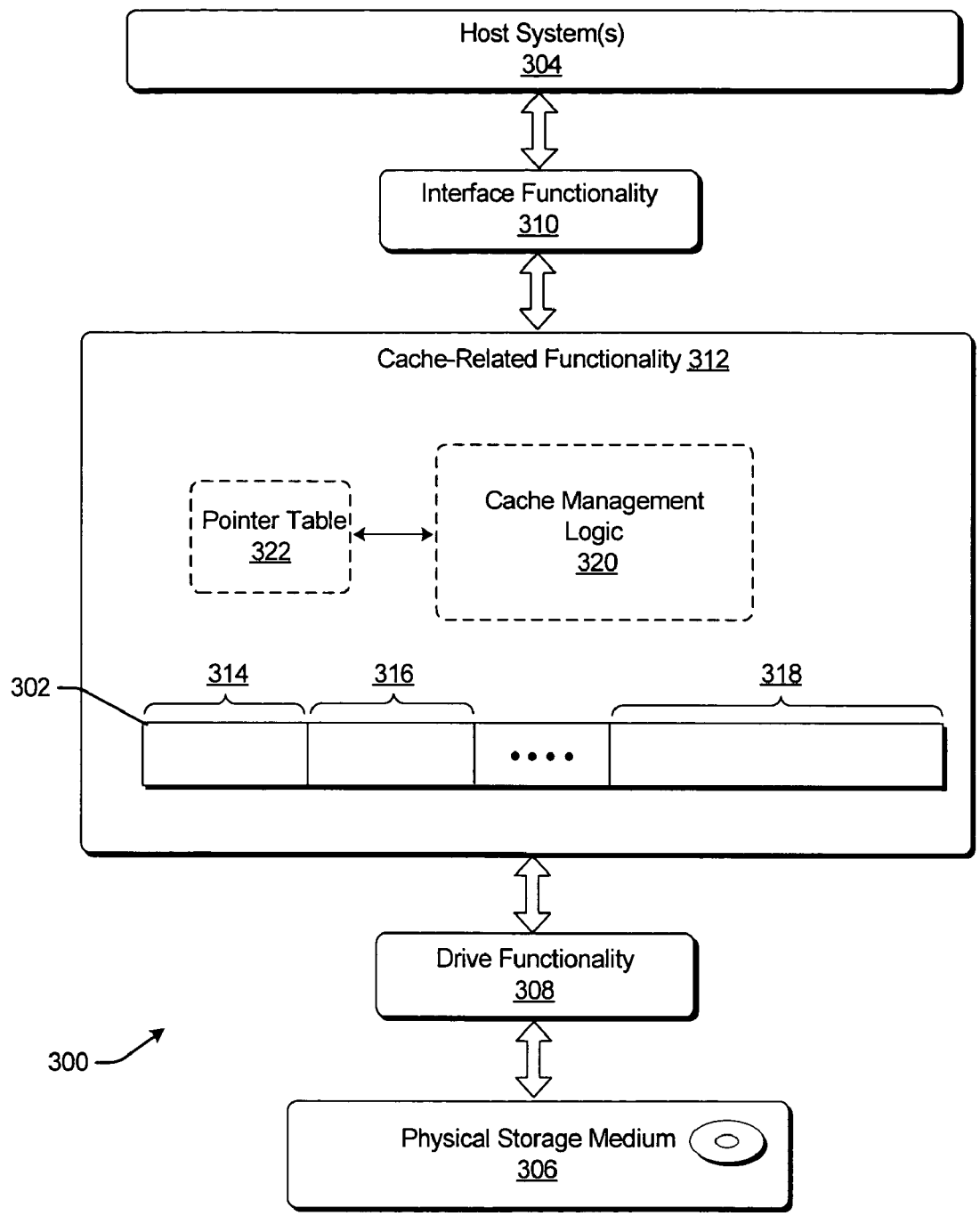
FIG. 3 shows an exemplary system for reading information from a storage medium using a segmented cache memory.

FIG. 3 shows an exemplary system 300 that utilizes a segmented cache memory 302. The system 300 includes a host system 304 that interacts with a physical storage medium 306 via drive functionality 308 and interface functionality 310, with the assistance of cache-related functionality 312.

More specifically, the host system 304 can represent any kind of device. In one case, the host system 304 can represent any kind of computer device, such as a general purpose computer workstation, a laptop computer, a personal digital assistant, or other type of computing device. Alternatively, the host system 304 can represent an application specific device, such as a game console (e.g., in one exemplary application, the Xbox™ game console produced by Microsoft Corporation of Redmond, Wash.), an audio playback device, a DVD playback device, or other kind of device.

The physical storage medium 306 can comprise any kind of magnetic storage medium, any kind of optical storage medium, or any other type of storage medium. For instance, for magnetic media, the storage medium 306 can comprise a magnetic hard disk. For optical media, the storage medium 306 can comprise a compact disc (CD), a digital versatile disc (DVD), and so on. In one case, the optical storage medium can be a read-only type of medium. In another case, the optical storage medium can be both read from and written to. This disclosure will recurrently make reference to the case of a game console which interacts with game information stored on an optical storage medium; however, as noted above, this is merely one of many possible applications of the cache management strategies described herein.

The drive functionality 308 and the interface functionality 310 can be selected to suit different environment-specific applications. For magnetic storage media, the drive functionality 308 can comprise a magnetic disk reader/writer. For optical storage media, the drive functionality 308 can comprise an optical disc reader. For example, although not shown, a conventional DVD drive mechanism includes a drive motor for spinning the optical disc, a laser and accompanying lens system for reading information from the spinning disc, various tracking functionality for moving the laser assembly, and so forth.

The interface functionality 310 can comprise any kind of hardware and/or software for facilitating interaction between the host system 304 and the drive functionality 308. Convention interface functionality includes Small Computer System Interface (SCSI) functionality, Integrated Drive Electronics (IDE) functionality, AT Attachment Packet Interface (ATAPI) functionality, and so on. This functionality 310 can, in one implementation, correspond to one or more cards with appropriate hardware and software for interfacing between the host system 304 and the drive functionality 308.

The cache-related functionality 312 is illustrated as positioned between the drive functionality 308 and interface functionality 310 to facilitate discussion. This functionality 312 can in fact correspond to a separate module that is positioned as shown. However, more generally, the cache-related functionality 312 can be incorporated in any of the other functional modules shown in FIG. 3, or some other functional module that is not shown in FIG. 3. That is, the cache-related functionality 312 can be incorporated in the host system 304, the interface functionality 310, or the drive functionality 308, or some other functional module that is not shown. Alternatively, the features shown in the cache-related functionality 312 can be distributed over multiple functional modules shown in FIG. 3, or over additional functional modules that are not shown in FIG. 3.

The cache-related functionality 312 can include the segmented cache memory 302 itself. The segmented cache memory 302 can correspond to a predetermined portion of memory, such as static random access memory (RAM), or other kind of memory. It can be physically implemented using one or more memory chips. In one exemplary and non-limiting example, the cache memory 302 can comprise a total of 2 MB of information, which can store up to 64 error correction code (ECC) blocks of information.

The segmented cache 302 is, as the name suggests, partitioned into plural segments (314, 316, . . . 318). These cache segments (314, 316, . . . 318) effectively correspond to, and are managed as, independent cache memories. In a preferred implementation, the cache-related functionality 312 allocates portions of a single physical memory device to create the different cache segments (314, 316, . . . 318). As will be described below, these cache partitions can be created using pointers.

The cache-related functionality 312 also includes cache management logic 320. This logic 320 generally represents any mechanism used to establish the cache segments (314, 316, . . . 318) and to subsequently utilize the cache segments (314, 316, . . . 318) to read information from the storage medium 306. To facilitate illustration and description, the cache management logic 320 is shown as a unified module; however, the various tasks represented by this module can also be implemented at different locations within the system 300 shown in FIG. 3.

The cache management logic 320 makes use of a pointer table 322. The pointer table 322 contains a collection of parameters used to manage the segmented cache 302. These parameters include pointers that respectively define the beginning and end of each cache segment (314, 316, . . . 318). These parameters also include one or more pointers used to designate locations within each cache segment (314, 316, . . . 318) (to be described in detail below). Further, these parameters may include various accounting information used to administer the segmented cache memory 302, such as least recently used (LRU) counter information used to govern a cache segment eviction algorithm (again, to be described in detail below).

Overview of Exemplary Benefits Provided by the Segmented Cache Memory

Figure 4:
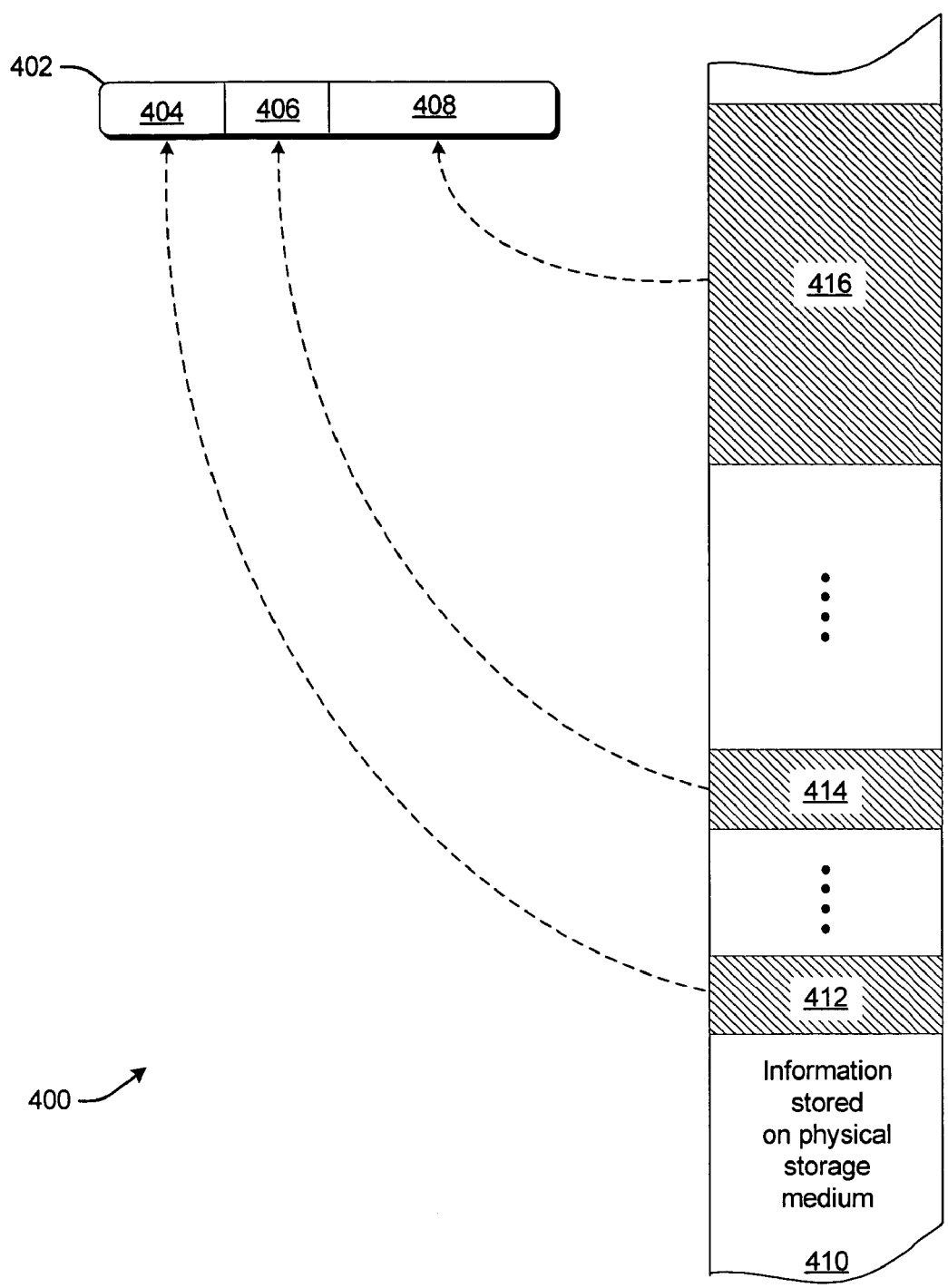
FIG. 4 shows an exemplary correspondence between a segmented cache memory and the contents of a storage medium.

FIG. 4 illustrates an exemplary application 400 of a segmented cache memory 402. This segmented cache memory 402 is a particular implementation of the general segmented cache memory 302 shown in FIG. 3. The application 400 serves as a vehicle for discussing some of the attendant benefits of the system 300 shown in FIG. 3. Accordingly, throughout the following discussion, reference will also be made back to other features in the overall system 300 shown in FIG. 3.

The exemplary segmented cache memory 402 includes three cache segments, namely, a first cache segment 404, a second cache segment 406, and a third cache segment 408. In this exemplary and non-limiting example, the two cache segments (404, 406) are the same size, and the third cache segment 408 is twice the size of either the first cache segment 404 or the second cache segment 406.

The information 410 shown to the right of FIG. 4 represents a collection of files and other information stored on the storage medium 306 (of FIG. 3). For example, in a game application, the information may represent a plurality of files that store vertex and texture information used to constitute characters and other scene objects, a plurality of files that store audio information segments used for playback during the execution of the game, a plurality of files used to store game engine information used to control the behavior of the game, and so on. More specifically, the vertical arrangement of the information 410 in FIG. 4 generally represents the sequential arrangement of information presented on the tracks of the storage medium 306. A game developer may generally attempt to arrange the information 410 on the storage medium 306 such that files that are likely to be accessed in close temporal succession are stored in close physical proximity to each other. However, the very nature of game play is unpredictable, which means that the host system 304 will inevitably be forced to make accesses to dispersed locations within the information 410 during the execution of the game. As described above, in the related art approach described in connection with FIGS. 1 and 2, this unpredictable access to different parts of the storage medium 306 in a short time frame will require that the cache memory be flushed and refilled on a relatively frequent basis. This, in turn, can result in poor performance.

The solution shown in FIG. 4 ameliorates some of the above-described difficulties. Namely, FIG. 4 shows that cache segment 402 stores information associating with portion 412 of the information 410, cache segment 406 stores information from portion 414 of the information 410, and cache segment 408 stores information from portion 416 of the information 410. For instance, in one case, the host system 304 may have made an initial read to a location within portion 412 of the information 410, prompting the drive functionality 308 to retrieve a block of information in this portion 412 and then assign it to one of the cache segments—in this exemplary case, cache segment 404. The cache management logic 320 can then instruct the drive functionality 308 to fill out the remainder of cache segment 404 by pre-fetching additional blocks of information from information 410, and then storing this additional information in the cache segment 404. As will be described in greater detail below, the cache management logic 320 can perform this pre-fetching by determining the information that the host system 304 is likely to subsequently request from the storage medium 306, and then retrieving this information. This pre-fetched information may correspond to blocks of information that contiguously follow the original requested block of information, but the pre-fetched information need not have a contiguous relationship with respect to the original requested block of information. In any event, as a result of the filling behavior, cache segment 404 effectively stores, and thus represents, the information in portion 412 of the information 410 (which is shown in FIG. 4 as a contiguous portion of information 410, but it need not be).

The other cache segments (406, 408) can be filled out in the same manner described above. For instance, suppose that the host system 304 made a subsequent request for another part of the information 410. The cache management logic 320 will first attempt to determine whether the segmented cache memory 402 stores the requested information; if it does not, the cache management logic 320 will retrieve the requested information from the storage medium 306 and then fill out another cache segment in the manner described above. Further details regarding the algorithms that can be used to govern this behavior will be described in later sections. The general result of this cache management behavior is the arrangement shown in FIG. 4, where different cache segments (404, 406, 408) effectively "serve" different portions (412, 414, 416) of the information 410 stored on the storage medium 306.

The cache segments (404, 406, 408) effectively operate as separate and autonomous cache memories. As such, at worse, a cache miss will result in the flushing and refilling of one of the cache segments, not all of them. This is beneficial, as a frequently used cache segment can be retained to continue to service subsequent host system read requests. Stated in another way, the segmented cache 402 allows the host processor 304 to jump to different parts of the information 410 without necessarily invoking a cache memory flush and refill operation upon every jump. Ultimately, the strategy can have the effect of reducing the total number of cache misses, and subsequently improving the performance of a read operation.

The cache management logic 320 will be, however, forced to read information from the storage medium 306 when a read request lies outside the bounds of the portions (412, 414, 416) of information 410. This can prompt the cache management logic 320 to flush and refill one of the cache segments (404, 406, 408). However, the frequency of such flushes and refills can be reduced by resorting to a circular fill technique. As will be described in detail in a later section, the circular fill technique can add new information to the cache segments (404, 406, 408) in a wrap-around fashion whenever a cache hit occurs. This fill operation can be performed, using pre-fetch functionality, when the system 300 is idle. By virtue of this mechanism, the portions (412, 414, 416) stored in the cache segments (404, 406, 408) can iteratively "migrate" as the information 410 in the storage medium 306 is consumed. Generally, this iterative reading from the storage medium 306 does not negatively affect performance, as the drive mechanism 308 is configured to pull this information from the storage medium 306 during idle times prior to it being actually requested by the host system 304. In other words, the drive mechanism 308 can be expected to be reading ahead of the actual requests made by the host system 304. The circular fill technique can therefore further improve the performance of the system 300, e.g., by reducing cache misses.

In order to function in the above-described manner, the cache management logic 320 can include mechanisms for executing a number of tasks. One such mechanism governs the creation of the cache segments. Another such mechanism governs the operation of the circular fill functionality. Another such mechanism governs the rules used to decide which cache segment should be flushed (e.g., as determined by an eviction algorithm). The cache management logic 320 can also perform additional functions not specifically identified above.

The following sections provide details regarding each of the above-identified mechanisms implemented by the cache management logic 320. Again, the cache management logic 320 is a general "container" that can refer to multiple mechanisms implemented by different parts of the system 300 shown in FIG. 3, such as the host system 304, the drive functionality 308, etc.

Functionality for Creating Cache Segments

Referring back to FIG. 3, the cache management logic 320 first governs the creation of cache segments (314, 316, . . . 318). In general, the cache management logic 320 can select the number of cache segments (314, 316, . . . 318) as well as the size of each of these cache segments. The cache management logic 320 can employ any one of multiple different strategies described below to perform this task.

In one strategy, the cache management logic 320 can partition the segmented cache memory 302 in advance of a reading operation to include a predetermined number of cache segments (314, 316, . . . 318). The cache segments (314, 316, . . . 318) can then remain fixed throughout the reading operation. The cache management logic 320 can provide any number of cache segments (314, 316, . . . 318). In one case, the number of cache segments (314, 316, . . . 318) can be some power of 2, that is 1, 2, 4, 8, 16, 32, . . . $2^n$. Specifically, it is anticipated that segmented cache memories having between 2 and 16 segments will serve a great majority of applications. However, it is also possible to partition the segmented cache memory 302 into some number of segments other than a power of two, such as 3, 5, 6, 7, and so on.

In one implementation, each of the cache segments (314, 316, . . . 318) has an equal size. In another application, the cache segments (314, 316, . . . 318) can vary in size. In one implementation, larger cache segments can be created by coalescing smaller cache segments. Thus, for example, if there are $2^n$ cache segments, such as eight cache segments, then the last four of these cache segments can be coalesced to form a larger cache segment, producing a total of five autonomous cache segments. If the cache management logic 320 specifies no partitioning, then the entire cache memory is treated as a single cache segment (that is, in other words, the cache memory 302 is left un-segmented as a default).

In one example, a cache segment size should be selected to be large enough to accommodate a minimum readable ECC block size (e.g., 32 KB, or sixteen 2 KB sectors). For example, a 2 MB segmented cache can store up to 64 ECC blocks. This segmented cache can be divided into 16 segments, each having 4 ECC blocks (which is the equivalent of 64 two KB sectors) per cache segment.

In one implementation, the cache management logic 320 can set up the segmented cache memory 302 so that the cache segments (314, 316, . . . 318) are not allocated to specific information types. In other words, in the course of a read operation, any given cache segment (314, 316, . . . 318) can receive any type of information retrieved from the storage medium 306. Consider the example, introduced above, in which the storage medium 306 stores game information that includes a plurality of files that contain vertex and texture information used to constitute characters and other scene objects, a plurality of files that contain audio information segments used for audio playback during the execution of the game, a plurality of files that contain game engine information used to control the behavior of the game, and so on. Any cache segment (314, 316, . . . 318) can be initially filled with a first kind of game information, and, upon being flushed, it can then be filled with a second kind of game information.

In another application, however, the cache management logic 320 can allocate specific cache segments (314, 316, . . . 318) for storing specific types of information. More specifically, the cache management logic 320 can allocate one of more cache segments for storing a first type of information, one or more other cache segments for storing a second type of information, one or more other cache segments for storing a third type of information, and so on. Each collection of cache segments devoted to an information type defines a "cache segment group" (where each cache segment group can include one or more cache segments).

Figure 5:
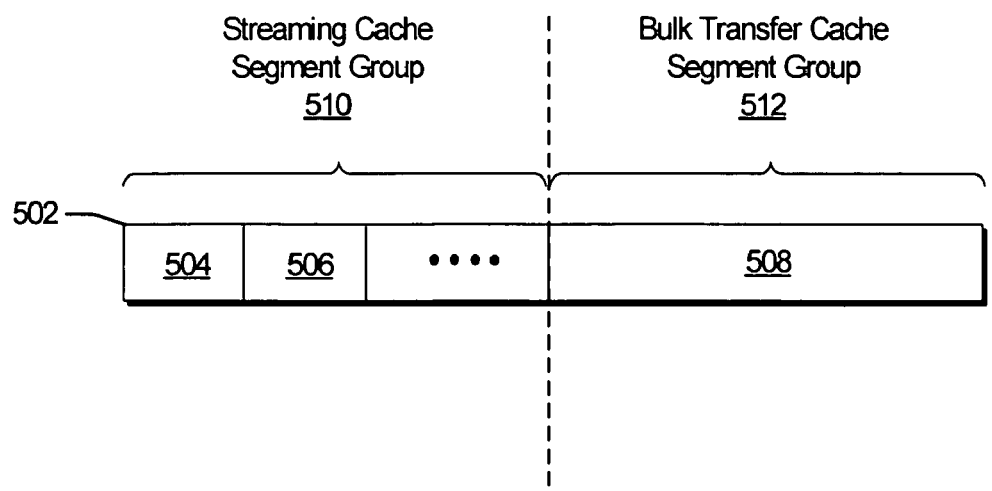
FIG. 5 shows an allocation of cache segments into two cache segment groups, a first group handling the retrieval of streaming transfer type information and a second group handling the retrieval of bulk transfer type information.

Consider the illustrative case of the segmented cache memory 502 of FIG. 5. This segmented cache memory 502 includes cache segments 504, 506 and 508, etc. A first cache segment group 510 is defined that includes at least cache segments 504 and 506, and a second cache segment group 5120 is defined that includes only cache segment 508, which is larger in size than any of the cache segments (504, 506, . . . ) in the first cache segment group 508.

Different applications and technical environments can employ different cache segment grouping schemes. One exemplary grouping scheme will be set forth herein with reference to the game playing environment, where the storage medium 306 provides the multiple files defined above that provide different types of game information. In this context, the cache management logic 320 can devote the first group 510 of cache segments to handling any information that is presented in a streaming mode of information transfer. The cache management logic 320 can then devote the second group 512 to handling any information that is presented in a bulk mode of information transfer. In one exemplary game environment, the host system 304 may employ the streaming mode of information transfer to read audio information. In this technique, the drive functionality 308 retrieves audio segments from the storage medium 306 generally on an as-needed basis. Accordingly, the drive functionality 308 can be configured to forward this information to the first cache segment group 510 just before it is read by the host system 304. This mode of information transfer is desirable because the audio segments are used throughout the entire game play, and it may be inefficient to store a large amount of such audio segments in the game console's system memory (not shown) in advance. Since this audio information is consumed on an as-needed basis, the drive functionality 308 generally has the ability to retrieve information at a much higher rate than its rate of consumption by the host system 304.

In contrast, the host system 304 may employ the bulk mode of information transfer to read other kinds of information, especially when the game is first started, when the user switches between game levels, or when the user prompts any other dramatic change in game mode. For example, when the game is started, the host system 304 will seek to pull a large quantity of game information from the storage medium 306 and place it into the game console's system memory (not shown). Such information can include vertex information and texture information used to compose a scene with characters, game engine information, and so on. The general objective of the bulk transfer of information is to pull this information off the storage medium 306 as quickly as the drive functionality 308 can furnish it, and then store it in the game console's system memory (not shown).

As can be seen, the streaming mode of information transfer uses a significantly different retrieval paradigm compared to the bulk mode of information transfer. In other words, these two modes of information retrieval impose significantly different demands on the system 300. The use of separate cache segment groups (510, 512) assigned to the streaming transfer mode and bulk transfer mode helps accommodate these separate demands, and thereby can improve performance when both streaming and bulk transfer operations are being performed at the same time (e.g., in interleaved fashion). For frame of reference, if such a mixture of streaming and bulk transfer operations is performed using the approach described in FIGS. 1 and 2, then the non-segmented cache memory 102 may be frequently flushed and refilled, resulting in many cache misses and consequent poor performance. Particularly, in the conventional technique, for instance, there is the risk that the bulk transfer of information will interfere with the presentation of streaming audio information.

In the case where cache segment groups are allocated to specific information types, the host system 304 can be configured to interact with the dedicated cache segment groups by submitting read requests to the drive functionality 308 which specify the cache segment groups invoked by the read requests. This operation is referred to herein as "hinting," as the host system 304 effectively informs the drive functionality 308 (that is, provides "hints to" to the drive functionality 308) regarding which cache segment group a read request pertains to. The host system 304 can perform this function by sending one or more commands to the drive functionality 308 which specify the targeted cache segment group. Or the host system 304 can communicate group-specific information using any unused bits in a read request itself. Still other strategies can be used for conveying this group affiliation. In any case, the cache management logic 320 can respond to this information by retrieving the requested information from the designated cache segment group (if it is present there), or retrieving it directly from the storage medium 306 (if it is not present in the cache memory).

In summary, the above-described scenarios pertained to a first case where none of the cache segments were affiliated with specific information types, and a second case where all of the cache segments were affiliated with specific information types. In addition, various hybrid arrangements are possible. In a third case, for instance, some of the cache segments are not affiliated with specific information types, while other cache segments are affiliated with specific information types.

Finally, the above-discussed cases assumed a static allocation of cache segments (314, 316, . . . 318) throughout a reading operation. In a static allocation, the host system 304 utilizes the same number and size of cache segments throughout a reading operation. However, the cache management logic 320 can also dynamically vary the cache segment allocation scheme during a read operation to suit different reading patterns encountered in the course of the reading operation. This functionality can be implemented in different ways. In one technique, the cache management logic 320 can perform analysis to assess the pattern exhibited by an ongoing read operation, and can vary the segmentation scheme during operation to best suit the prevailing pattern. This reevaluation of cache segmentation can be performed periodically, or can be triggered when detected changes exceed a prescribed threshold. In another example, the cache management logic 320 can receive express instructions to change the cache segmentation scheme during the read operation. Such instructions may originate from any source, such as the host system 304, or from information read from the storage medium 306 itself (e.g., in the form of coded information which governs the cache segmentation scheme).

Functionality for Filling the Cache Segments

Once the cache segments (314, 316, . . . 318) are defined, different strategies can be used to fill the cache segments (314, 316, . . . 318) with information retrieved from the storage medium 306. For instance, in a flat filling technique, upon the event of a cache miss, the drive functionality 308 retrieves the requested information from the storage medium 306. The drive functionality 308 stores this information in one of the cache segments. The drive functionality 308 can also read ahead to retrieve a series of contiguous blocks of information from the storage device 306, starting from the position of the requested information. The drive functionality 306 can then fill this added information into the cache segment until it hits the end of the cache segment. Such read-ahead information thus remains available in the event that the host system 304 requests a contiguous block of information that follows the prior requested information.

Alternatively, instead of simply reading ahead to retrieve a series of contiguous blocks of information, the host system 304 can actively pre-fetch the information to fill out the remainder of the cache segment. This pre-fetch technique can involve determining a pattern exhibited by prior read activity to make a prediction of where the host system 304 is likely to read from next. For instance, it may be determined that the host system 304 is likely to read from the next contiguous block stored on the storage medium 306; however, unlike the case of a simple read-ahead operation, the pre-fetching analysis may alternatively determine that the host system 304 is likely to read from some non-contiguous block with respect to a prior read request. The pre-fetch technique can send instructions (e.g., pre-fetch commands) to the drive functionality 308 which tell it where to read from next based on the assessed read pattern. In this manner, the cache segment can be intelligently filled in with information that is likely to be requested by the host system 304 in the near future.

Figure 6:
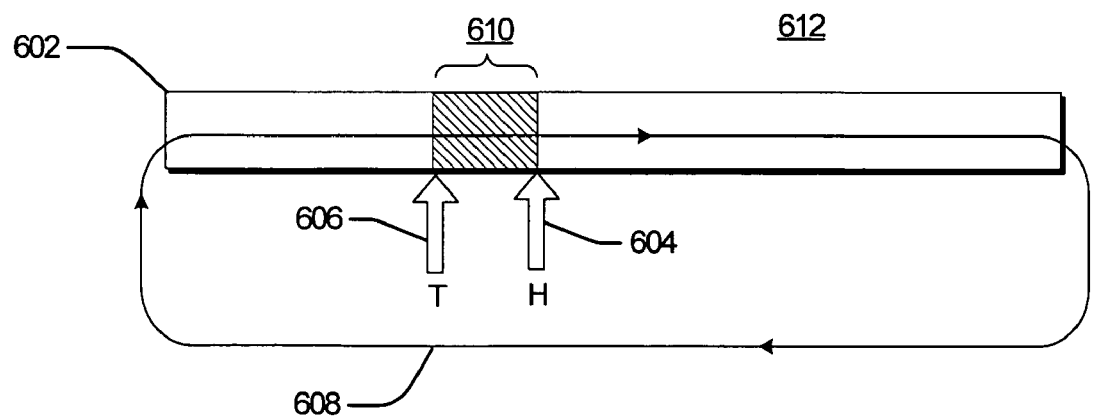
FIG. 6 shows an exemplary strategy for storing information in a cache memory in a wrap-around circular manner.

Other techniques besides the complete flush and refill method can be used. FIG. 6 illustrates one such alternative technique in which a cache memory 602 is refilled using a circular fill technique. The circular fill technique employs a head pointer 604 and a tail pointer 606. By way of overview, the circular fill technique successively fills in new information into the cache memory upon the occurrence of cache hits. This new information is added to the cache memory 602 in a circular (that is, wrap-around) manner defined by loop 608. In other words, suppose that the end of cache memory 602 corresponds to an information block No. 500. When adding new information to the cache memory 602 past this point, the cache management logic 320 can add this information to the beginning of the cache memory 602, e.g., starting at an information block No. 501.

The operation of the circular fill technique will be described in greater detail as follows. When a cache hit results in information being pulled from the cache memory 602, the cache management logic 320 is configured to move the head pointer 604 to the end of the cache memory pull (that is, to the end of a portion of cache memory that has been retrieved and sent to the host system 304). Moving the head pointer 604 ahead in this manner creates free storage space in the cache memory 602, e.g., behind the tail pointer 606. In particular, this memory space is "free" because it is unlikely that host system 304 will read from it again. Then, the cache management logic 320 instructs the drive functionality 308 to perform a pre-fetch operation to fill in the newly created free cache memory space. The pre-fetch operation can be based on the same considerations described above—that is, based on a determination of what blocks of information that the host system 304 is likely to request in the future (which, in turn, is based on an assessment of a prior reading pattern exhibited by a reading operation). The circular fill operation can be performed during times when the system 300 is not engaged in other activities, e.g., when the drive functionality 308 is otherwise idle. As a result of the circular fill technique, new information is added to the cache memory 602 in successive chunks, as opposed to the prior technique of completely flushing and refilling the cache memory 602 upon reaching its end. The circular fill technique thus potentially offers better performance than the flat flush and fill technique described above.

Information is added behind the tail pointer 606, rather than directly behind the header pointer 604, because there is some probability that the host system 304 may want to read information from a portion 610 of the cache memory 602 immediately in back of the head pointer 604. For instance, upon discovering an error in the read information, the system 300 may seek to reread information from the cache memory 602. By preserving recently read information in the portion 610, the system 300 ensures that the host system 304 can accurately retrieve such information from the cache memory 602 again if it needs to.

The circular fill technique described above can be applied to any cache memory, including un-segmented cache memory and segmented cache memory. In the latter case, the circularly fill technique can be applied to each cache segment, where the behavior of the circular fill in one cache segment is independent from the behavior of the circular fill in another cache segment. Alternatively, in a segmented cache memory application, the circular fill technique can be applied to some cache segments, but not other cache segments (where the other cache segments can employ some other kind of fill technique, such as the flat flush and refill technique).

The cache management logic 320 can execute the above-described circular fill technique using the pointer table 322. The table below shows one exemplary pointer table 322.

| Exemplary Pointer Table | | | |
|---|---|---|---|
| Segment 0 (314) | Segment 1 (316) | . . . | Segment $2^n$ (318) |
| LBA 0 | LBA 1 | . . . | LBA $2^n$ |
| Head 0 | Head 1 | . . . | Head $2^n$ |
| Tail 0 | Tail 1 | . . . | Tail $2^n$ |
| Length 0 | Length 1 | . . . | Length $2^n$ |
| LRU index 0 | LRU index 1 | . . . | LRU index $2^n$ |

Each column in the pointer table 322 corresponds to a different cache segment (314, 316, . . . 318) shown in FIG. 3; namely, the first column provides pointer information for cache segment 314, the second column provides pointer information for cache segment 316, and the third column provides pointer information for cache segment 318. It is presumed that there is a total number of $2^n$ cache segments, but this need not be the case. In any given column, the first row identifies the logical block address (LBA) of the cache segment, which essentially identifies the starting position of the cache segment. The second row identifies the position of the head pointer used in the cache segment (e.g., head pointer 604 in FIG. 6). The third row identifies the position of the tail pointer used in the cache segment (e.g., tail pointer 606 in FIG. 6). The fourth row identifies the length of the cache segment. And the last row provide a record that reflects when the cache segment was least recently used or how frequently it has been recently used (to be described in greater detail in the section below); this can be conveyed using counter information or other kind of accounting information.

Functionality for Flushing Information from the Cache Segments

Upon the occurrence of a cache miss (which occurs when the information requested by the host system 304 is not found in the segmented cache memory 302), the host system 304 proceeds by reading information from storage medium 306. This information is stored in one of the cache segments (314, 316, . . . 318), along with additional information that can be pre-fetched from the storage medium 306. To perform this function, the cache management logic 320 must decide which cache segment should be flushed so as to receive the new information. This section describes exemplary techniques that determine what cache segment should be flushed. These techniques are referred to as eviction algorithms.

The cache management logic 320 can apply one or more different eviction algorithms to determine what cache segment should receive the new information. In one algorithm, the cache management logic 320 can maintain a usage store for each cache segment (314, 316, . . . 318) that records when it was last used (corresponding to when the cache segment was last read by the host system 304). In particular, as noted above, the pointer table 322 can store this information. For example, the pointer table 322 can include counters for each cache segment; when a cache hit occurs for a particular cache segment, its respective counter is zeroed, while the counters associated with the other cache segments are incremented. Accordingly, this means that a large count value is indicative of a cache segment that has not be used in a relatively long time. The cache management logic 320 can access these usage stores when it needs to flush one of the cache segments (314, 316, . . . 318), so as to determine the least recently used (LRU) cache segment. The cache management logic 320 then proceeds to flush the least recently used cache segment and refill it with new information retrieved from the storage medium 306 in the manner described above.

In another technique, the cache management logic 320 determines which cache segment (314, 316, . . . 318) to flush by determining the least frequently used (LFU) cache segment. It then flushes this least frequently used cache segment and refills it with new information in the manner described above. The least frequently used cache segment (314, 316, . . . 318) will not necessarily coincide with the least recently used cache segment (314, 316, . . . 318).

Still other eviction algorithms can be used to determine the behavior of the cache management logic 320.

In one implementation, the cache management logic 320 applies the same eviction algorithm to all of the cache segments (314, 316, . . . 318) in the segmented cache memory 302. In another implementation, the cache management logic 320 can apply different eviction algorithms to different respective cache segments (314, 316, . . . 318).

B. EXEMPLARY METHOD OF OPERATION

Figure 7:
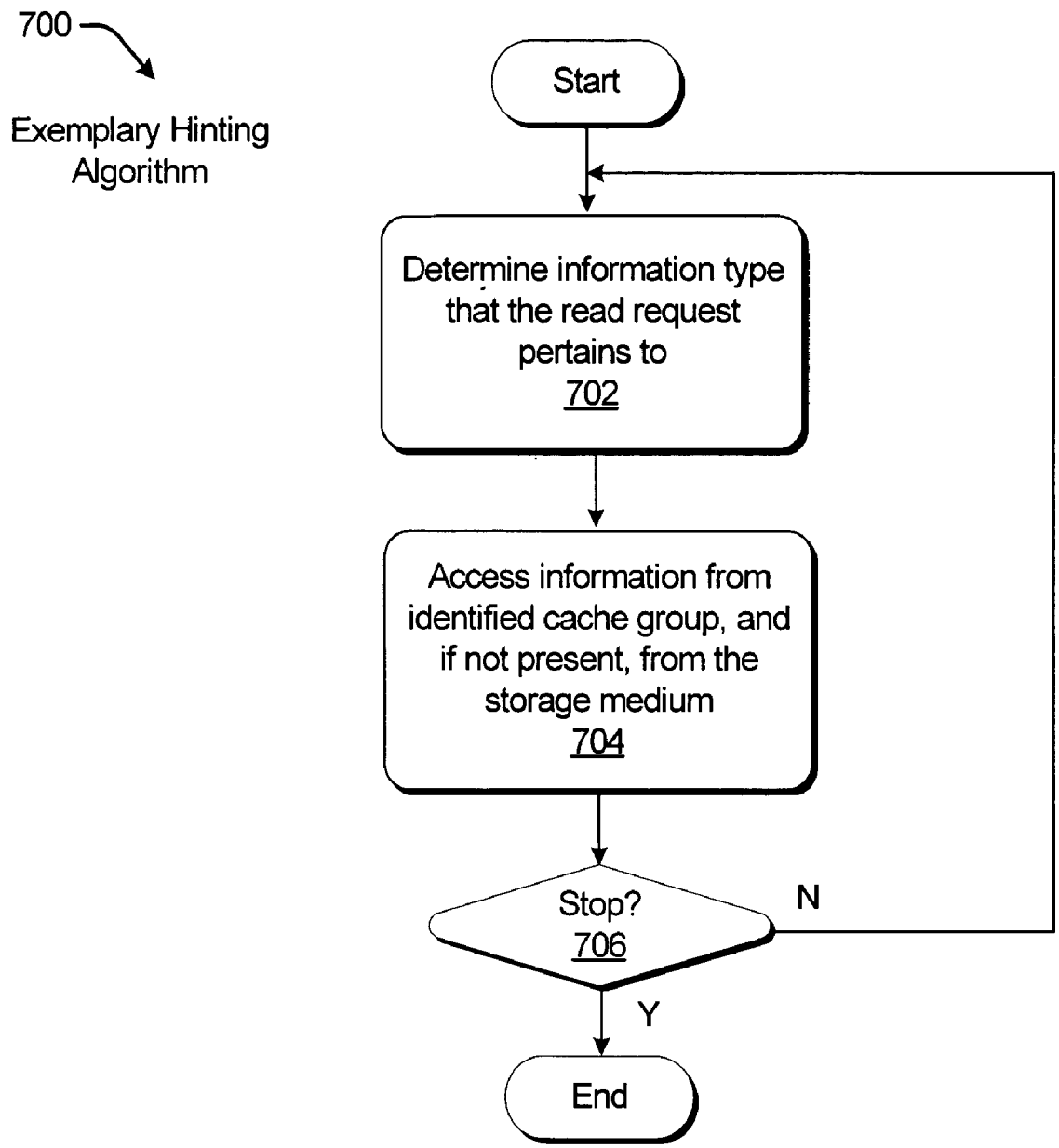
FIG. 7 shows an exemplary procedure for using hinting to retrieve information from a segmented cache memory.
Figure 8:
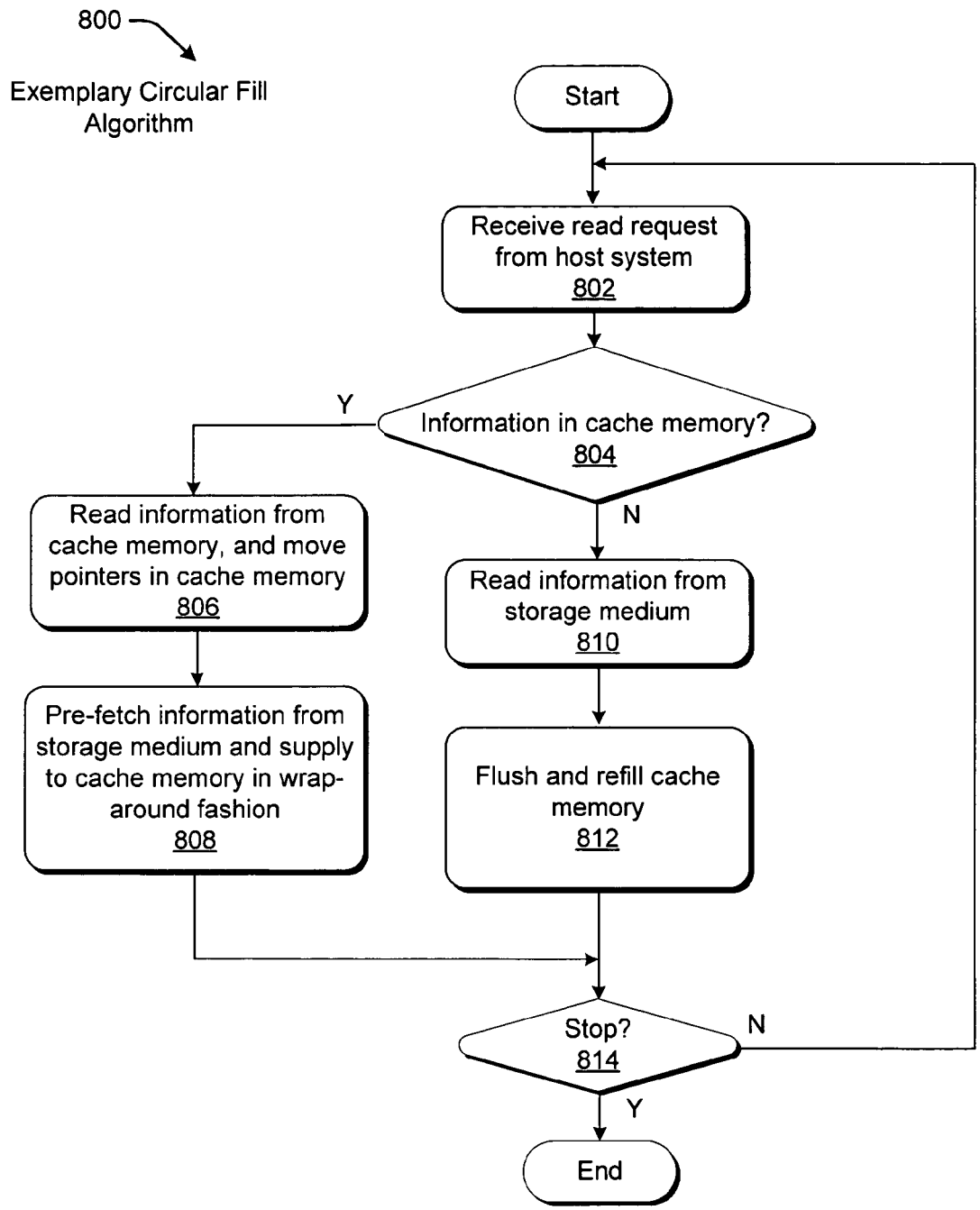
FIG. 8 shows an exemplary procedure for storing information in a cache memory in a wrap-around circular manner.
Figure 9:
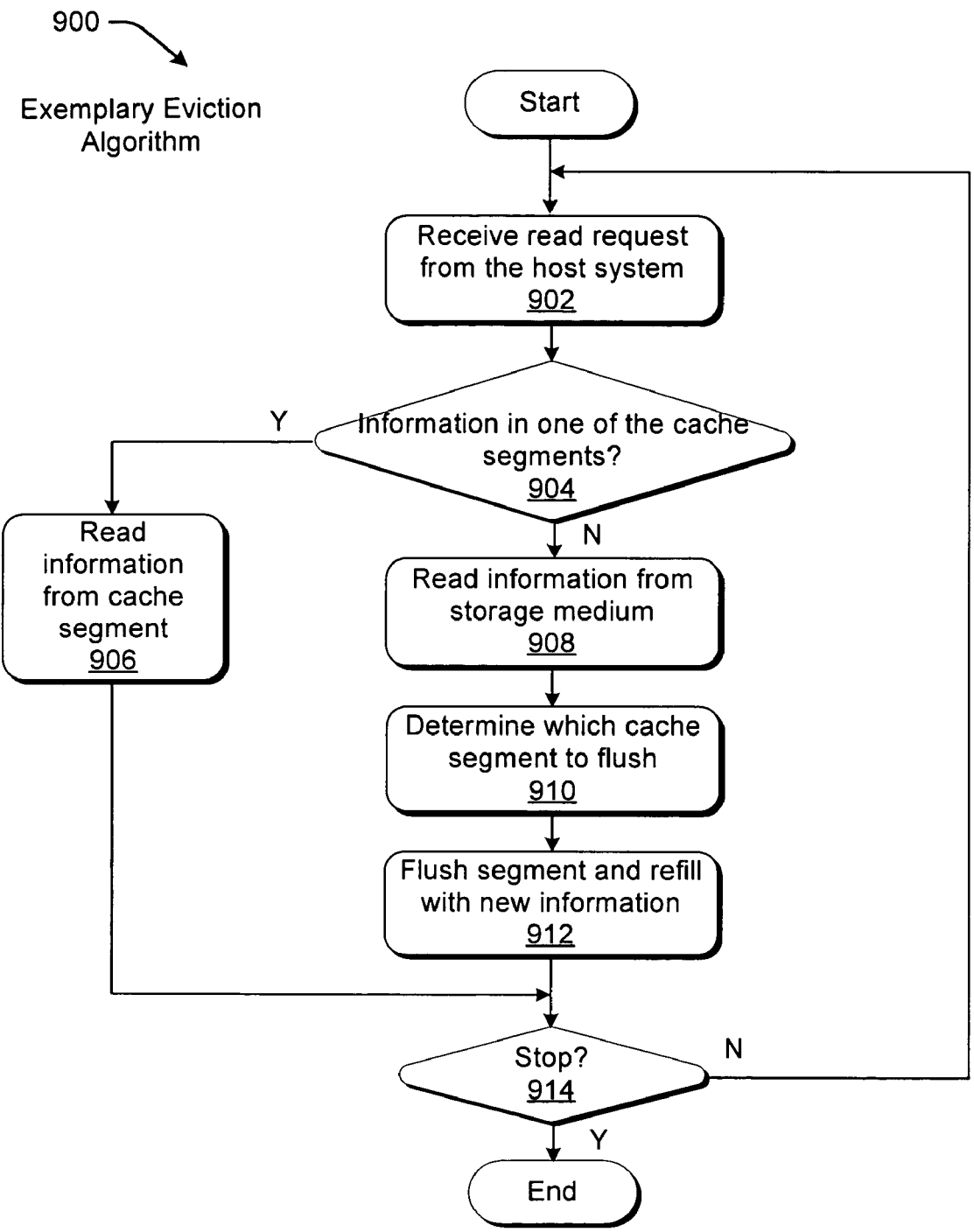
FIG. 9 shows an exemplary procedure for reading information from a segmented cache memory, and for evicting information from the segmented cache memory in the event of a cache miss.

FIGS. 7-9 summarize some of the functionality described in Section A in flow chart form. In general, to facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

Cache Hinting Procedure

FIG. 7 shows an exemplary procedure 700 by which the host system 304 can inform the cache-related-functionality 312 what cache segment group that a read request targets. This has been referred to above as "hinting." Refer, for instance, momentarily back to the example of the segmented cache memory 502 of FIG. 5. That segmented cache memory 502 includes a first group 510 of cache segments for handling the transfer of information in a streaming mode, and a second group 512 of cache segments for handling the transfer of information in a bulk transfer mode. The hinting procedure 700 shown in FIG. 7 allows the host system 304 to inform the cache management logic 320 which cache segment group (510, 512) that a particular read request targets. The cache management logic 320 responds by accessing the requested information from the identified cache segment group (if it is present there).

More specifically, step 702 entails determining an information type invoked by a read request (if applicable). This can be performed using a variety of techniques. In one technique, the cache management logic 320 can read a special instruction sent by the host system 304 which identifies the cache group involved. In another technique, the cache management logic 320 can read a special code embedded in the read request itself, e.g., expressed using one or more unused bits in a conventional read request instruction. Still other techniques can be used to determine the cache group that is being targeted by the read request.

Step 704 entails retrieving the requested information from the identified cache segment group (providing that the cache segment group contains this information). If the cache segment group does not contain this information, then the cache management logic 320 can instruct the drive mechanism 308 to retrieve the information from the storage medium 306.

Step 706 indicates that the above described procedure 700 is repeated a plurality of times until the host system 304 terminates the process.

Circular Cache Fill Procedure

FIG. 8 shows an exemplary circular fill procedure 800 for filling a cache memory using a wrap-around technique. The following discussion will make reference to the cache memory 602 shown in FIG. 6, which includes a head pointer 604 and a tail pointer 606. But more generally, the circular fill procedure 800 shown in FIG. 8 can apply to either an un-segmented cache memory or a segmented cache memory. In the latter case, the circular fill procedure 800 can be used to fill each of the cache segments.

In step 802, the cache management logic 320 receives a read request from the host system 304. In step 804, the cache management logic 320 determines whether the requested information is present in the cache memory 602. If so, in step 806, the cache management logic 320 orchestrates the retrieval of information from the cache memory 602. In this step 806, the cache management logic 320 also moves the head pointer 604 to the end of the portion of the information that has just been read. This operation can free up new space in the cache memory 602 for storing new information.

In step 808, the cache management logic 320 instructs the drive functionality 308 to pre-fetch new information from the storage medium 306. It then supplies the new information to the freed up space of the cache memory 602. This operation can be performed when the system 300 is idle so as not to interfere with other operations. When the pointers (604, 606) reach the end of the cache memory 602 they wrap around to the beginning of the cache memory 602. In the above-described manner, the cache management logic 320 in conjunction with drive functionality 308 can read information from the storage medium 306 in successive chunks upon the occurrence of successive cache hits. The information is generally read prior to it being requested by the host system 304. By virtue of the circular fill technique, the procedure 800 does not incur the dramatic spikes exhibited by the procedure 200 shown in FIG. 2, where the entire cache memory 102 is flushed and refilled upon reaching the cache memory's end.

Finally, if the information does not reside in the cache memory (as determined in step 804), then step 810 prompts the cache management logic 320 to retrieve this information from the storage medium 306. In step 812, the cache management logic 320 flushes the cache memory 602 and refills it with the retrieved information, as well as additional look-ahead information that it may pre-fetch from the storage medium 306.

Step 814 indicates that the above-described procedure 800 is repeated until the host system 304 terminates the procedure 800.

Cache Segment Eviction Procedure

FIG. 9 shows an exemplary procedure for determining which cache segment should be flushed and refilled upon a cache miss. When discussing this figure, cross reference will be made to the general system 300 of FIG. 3.

In step 902, the cache management logic 802 receives a read request from the host system 304. In step 902, the cache management logic 802 determines whether the requested information is stored in one of the cache segments (314, 316, . . . 318) of the segmented cache memory 302. In step 906, if the information is present in one of the cache segments (314, 316, . . . 318), then the cache management logic 320 retrieves the information from that location.

In step 908, if it is determined that the requested information is not in the segmented cache memory 302, then the cache management logic 320 and driving functionality 308 orchestrate the retrieval of this information from the storage medium 306.

In step 910, the cache management logic 320 determines which cache segment should be flushed to receive the newly retrieved information (as well as additional pre-fetched information retrieved from the storage medium 306). In one technique, the cache management logic 320 can identify the least recently used (LRU) cache segment (314, 316, . . . 318) as the one that should be flushed. In another technique, the cache management logic 320 can identify the least frequently used (LFU) segment (314, 316, . . . 318) as the one that should be flushed. Or some other eviction algorithm can be used. In any case, the cache management logic 320 can retrieve logged information from the pointer table 322 to assist it in making its decision. Such information can include counter information that reflects the LRU or LFU status of each cache segment (314, 316, . . . 318).

In step 912, the cache management logic 320 flushes the identified cache segment and refills it with the new information.

Step 914 generally indicates that the procedure 900 is repeated for a succession of read request from the host system 304 until the host system 304 terminates the procedure 900.

In closing, the individual features of the system 300 were described separately to facilitate explanation. These features can in fact be separately implemented. However, any combination of these features can also be implemented in one application. In one case, all of the above-described features can be incorporated in a single application.

C. EXEMPLARY APPLICATIONS

As mentioned above, the features described in FIG. 3 can be applied to many different kinds of technical environments. This section sets forth two such exemplary technical environments, namely, a general purpose computer technical environment and a game console technique environment.

Exemplary Computer Environment

Figure 10:
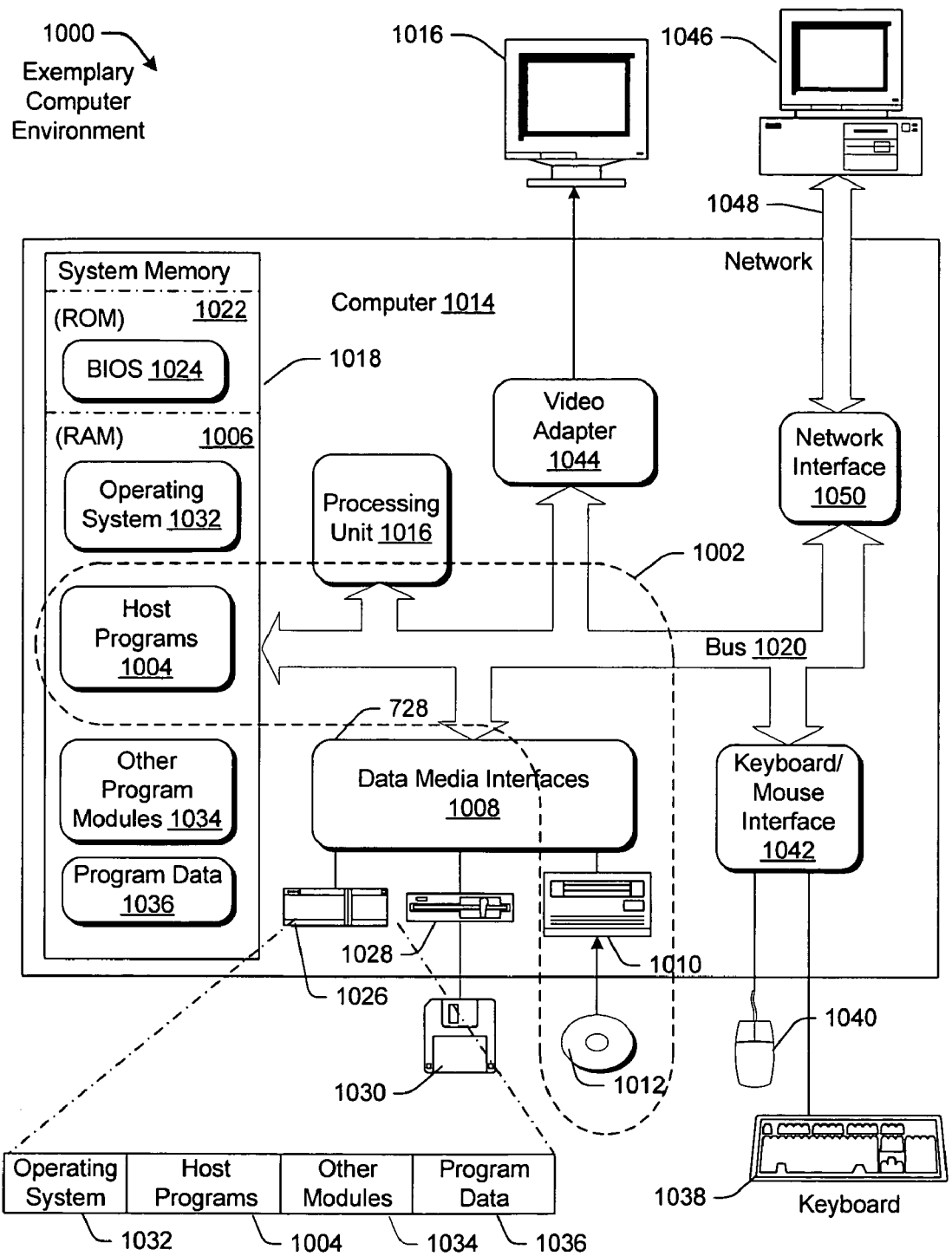
FIG. 10 shows an exemplary application of the segmented cache memory shown in FIG. 3 to a general purpose computer environment.

FIG. 10 shows an exemplary general purpose computer environment 1000 that can be used to implement the system 300 shown in FIG. 3. Namely, the element grouping 1002 identifies exemplary functionality that can be used to implement the system 300 shown in FIG. 3. This collection of functionality generally represents a host program 1004 implemented as a program stored in RAM memory 1006, a data media interface 1008, an optical drive mechanism 1010, and an optical storage medium 1012. The various cache management features described above can be implemented in any one of, or in any combination of, the elements shown in the element grouping 1002, or, in whole or in part, in other elements not included in the element grouping 1002. The environment 1000 as a whole will described in further detail below.

The computing environment 1000 includes a general purpose computer 1014 and a display device 1016. However, the computing environment 1000 can include other kinds of computing equipment. For example, although not shown, the computer environment 1000 can include handheld or laptop devices, set top boxes, mainframe computers, etc. Exemplary computer 1014 includes one or more processors or processing units 1016, a system memory 1018, and a bus 1020. The bus 1020 connects various system components together. For instance, the bus 1020 connects the processor 1016 to the system memory 1018. The bus 1020 can be implemented using any kind of bus structure or combination of bus structures.

Computer 1014 can also include a variety of computer readable media, including a variety of types of volatile and non-volatile media, each of which can be removable or non-removable. For example, system memory 1018 includes computer readable media in the form of volatile memory, such as the random access memory (RAM) 1006, and non-volatile memory, such as read only memory (ROM) 1022. ROM 1022 includes an input/output system (BIOS) 1024 that contains the basic routines that help to transfer information between elements within computer 1014, such as during start-up. RAM 1006 typically contains data and/or program modules in a form that can be quickly accessed by processing unit 1016.

Other kinds of computer storage media include a hard disk drive 1026 for reading from and writing to a non-removable, non-volatile magnetic media, a magnetic disk drive 1028 for reading from and writing to a removable, non-volatile magnetic disk 1030 (e.g., a "floppy disk"), and the optical disk drive 1010 for reading from and/or writing to the removable, non-volatile optical disk 1012 such as a CD-ROM, DVD-ROM, or other optical media. The hard disk drive 1026, magnetic disk drive 1028, and optical disk drive 1010 are each connected to the system bus 1020 by one or more data media interfaces 1008.

Generally, the above-identified computer readable media provide non-volatile storage of computer readable instructions, data structures, program modules, and other data for use by computer 1014. For instance, the readable media can store the operating system 1032, application programs (such as any kind of hosting program 1004), other program modules 1034, and program data 1036.

The computer environment 1000 can include a variety of input devices. For instance, the computer environment 1000 includes the keyboard 1038 and a pointing device 1040 (e.g., a "mouse") for entering commands and information into computer 1014. Input/output interfaces 1042 couple the input devices to the processing unit 1016. More generally, input devices can be coupled to the computer 1014 through any kind of interface and bus structures, such as a parallel port, serial port, game port, universal serial bus (USB) port, etc.

The computer environment 1000 also includes the display device 1016. A video adapter 1044 couples the display device 1016 to the bus 1020. In addition to the display device 1016, the computer environment 1000 can include other output peripheral devices, such as speakers (not shown), a printer (not shown), etc.

Computer 1014 operates in a networked environment using logical connections to one or more remote computers, such as a remote computing device 1046. The remote computing device 1046 can comprise any kind of computer equipment, including a general purpose personal computer, portable computer, a server, etc. Remote computing device 1046 can include all of the features discussed above with respect to computer 1014, or some subset thereof.

Any type of network 1048 can be used to couple the computer 1014 with remote computing device 1046, such as a WAN (e.g., the Internet), a LAN, etc. The computer 1014 couples to the network 1048 via network interface 1050, which can utilize broadband connectivity, modem connectivity, DSL connectivity, or other connection strategy.

Although not illustrated, the computing environment 1000 can provide wireless communication functionality for connecting computer 1014 with remote computing device 1046 (e.g., via modulated radio signals, modulated infrared signals, etc.).

Exemplary Game Console Environment

Figure 11:
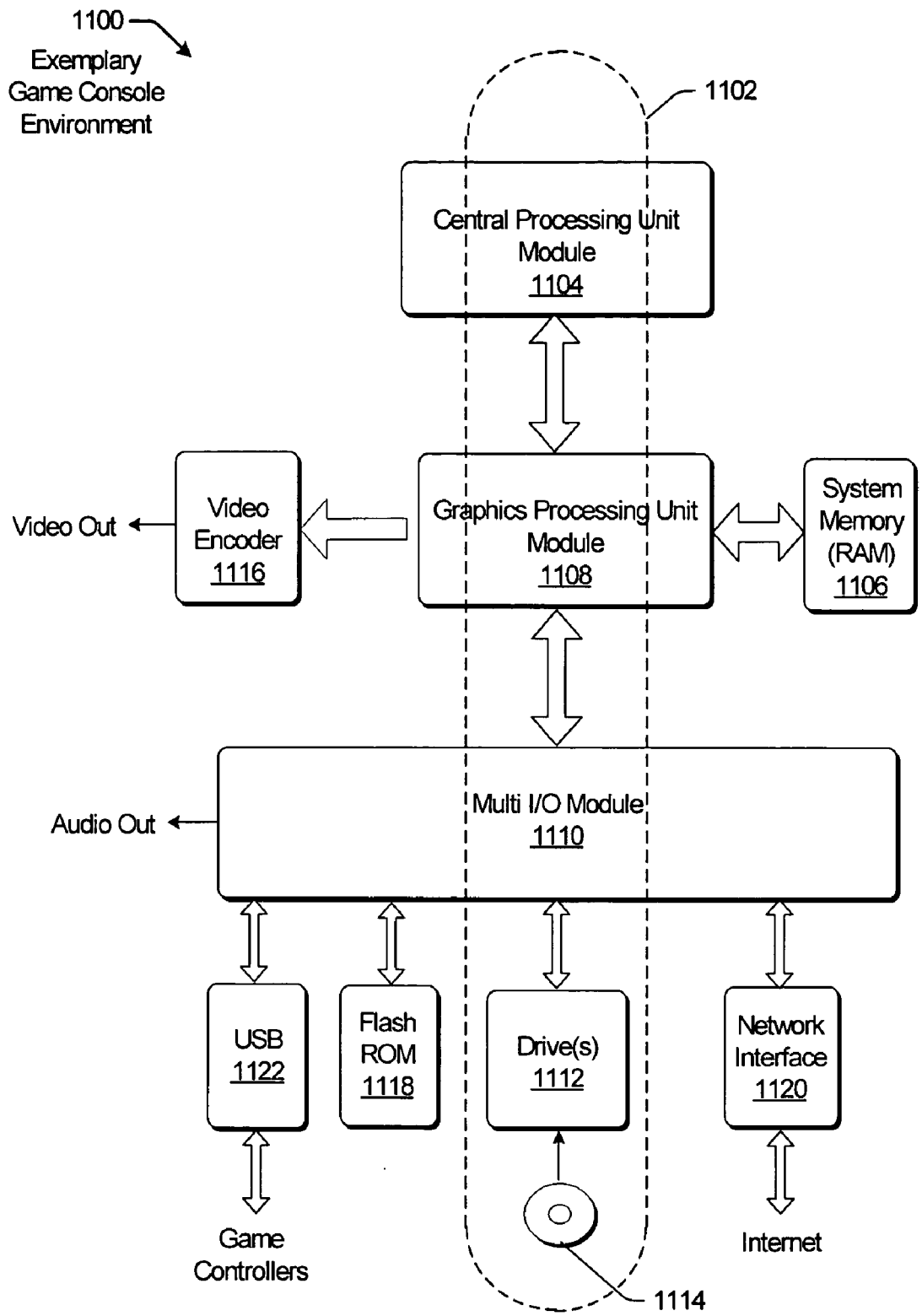
FIG. 11 shows an exemplary application of the segmented cache memory shown in FIG. 3 to a game console environment.

FIG. 11 shows an exemplary game console environment 1100 that can be used to implement the system 300 shown in FIG. 3. Namely, an element grouping 1102 identifies exemplary functionality that can be used to implement the system 300 shown in FIG. 3. This collection of functionality generally represents a central processing unit module 1004 that can implement a host program stored in RAM memory 1106 in conjunction with a graphical processing unit module 1108, a data media interface 1110, an optical drive mechanism 1112, and an optical storage medium 1114. The various cache management features described above can be implemented in any one of, or in any combination of, the elements shown in the element grouping 1102, or, in whole or in part, in other elements not included in the element grouping 1102. The environment 1100 as a whole will described in further detail below.

The game console environment 1100 delegates the bulk of data processing responsibilities to the computer processing unit module 1104 and the graphics processing unit module 1108. The central processing unit module 1104 performs high end control tasks, such as administration of the general flow of the game. The central processing unit module 1104 delegates lower level graphics rendering tasks to the graphics processing unit module 1108, which, for instance, can apply a conventional graphics pipeline for transforming vertex information into three dimensional game scenes for output to a display device (such as a television monitor) via a video encoder 1116. The central processing unit module 1104 and the graphics processing unit module 1108 can both draw from the system RAM memory 1106 using the unified memory architecture (UMA) technique.

The above-identified processing modules (1104, 1108) interact with a plurality of input and output sources via the multi I/O module 1110. More specifically, the multi I/O module 1110 can couple to the optical disc drive 1112, a flash memory device 1118, a network interface 1120, and various game controllers via a universal serial bus (USB) interface 1122.

The above two applications (e.g., the general purpose computer and game console) are merely exemplary; the features shown in FIG. 3 can be applied to many other types of environments.

In closing, a number of examples were presented in this disclosure in the alternative (e.g., case X or case Y). In addition, this disclosure encompasses those cases which combine alternatives in a single implementation (e.g., case X and case Y), even though this disclosure may have not expressly mentioned these conjunctive cases in every instance.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for reading information from an optical storage medium, comprising:
    providing a cache memory having multiple cache segments;

receiving a request for information stored on the optical storage medium;

determining whether the requested information is stored in one of the cache segments;

retrieving the requested information from said one of the cache segments if the information is determined to be stored in the cache memory; and retrieving the requested information from the optical storage medium itself if the information is determined not to be stored in the cache memory, wherein the cache memory includes a first group of at least one cache segment dedicated to handling a first type of information, and a second group of at least one cache segment dedicated to handling a second type of information, and wherein the first type of information pertains to information that is designated for retrieval in a streaming transfer mode in which parts of the information are retrieved on an as-needed piecemeal basis as the information is consumed, and the second type of information pertains to information that is designated for retrieval in a bulk transfer mode in which a bulk quantity information is retrieved as a whole, not in multiple parts on an on-needed piecemeal basis;

wherein the requested information is retrieved from said one cache segment, the method further comprising:

moving a pointer associated with said one cache segment ahead to define free cache space;

pre-fetching information from the optical storage medium; and filling the pre-fetched information into the free cache space of said one cache segment.

2. The method according to claim 1, wherein the retrieved information pertains to a game application.

3. The method according to claim 1, wherein the first type of information pertains to audio game information, and the second type of information pertains to game level load information.

4. The method according to claim 1, wherein the determining of whether the requested information is stored in one of the cache segments includes determining whether the requested information is stored in a cache segment identified in hint information received from a host system.

5. The method according to claim 1, wherein the pre-fetching is performed at a time in which a drive mechanism is not otherwise engaged performing other tasks.

6. The method according to claim 1, wherein the filling proceeds in circular manner by wrapping around from an end of said one cache segment to a beginning of said one cache segment.

7. A computer readable storage medium including machine readable instructions for implementing on a computing device, that when executed perform the method of claim 1.

8. A method for reading information from an optical storage medium, comprising:

providing a cache memory having multiple cache segments;

receiving a request for information stored on the optical storage medium;

determining whether the requested information is stored in one of the cache segments;

retrieving the requested information from said one of the cache segments if the information is determined to be stored in the cache memory; and retrieving the requested information from the optical storage medium itself if the information is determined not to be stored in the cache memory, wherein the cache memory includes a first group of at least one cache segment dedicated to handling a first type of information, and a second group of at least one cache segment dedicated to handling a second type of information, and wherein the first type of information pertains to information that is designated for retrieval in a streaming transfer mode in which parts of the information are retrieved on an as-needed piecemeal basis as the information is consumed, and the second type of information pertains to information that is designated for retrieval in a bulk transfer mode in which a bulk quantity information is retrieved as a whole, not in multiple parts on an on-needed piecemeal basis;

when the requested information is retrieved from the optical storage medium, the method further comprising:

determining which one of the cache segments should receive the requested information based on an eviction algorithm;

flushing the determined cache segment of its current contents; and storing the information retrieved from the optical storage medium in the determined cache segment.

9. The method according to claim 8, wherein the eviction algorithm determines the cache segment to receive the requested information by identifying the cache segment which has been least recently used.

10. The method according to claim 8, wherein the eviction algorithm determines the cache segment to receive the requested information by identifying the cache segment which has been least frequently used.

11. An apparatus for reading information from an optical storage medium, comprising:

a cache memory having multiple cache segments;

cache management logic, including:

logic configured to receive a request for information stored on the optical storage medium;

logic configured to determine whether the requested information is stored in one of the cache segments;

logic configured to retrieve the requested information from said one of the cache segments if the information is determined to be stored in the cache memory; and logic configured to retrieve the requested information from the optical storage medium itself if the information is determined not to be stored in the cache memory, wherein the first type of information pertains to information that is designated for retrieval in a streaming transfer mode in which parts of the information are retrieved on an as-needed piecemeal basis as the information is consumed, and the second type of information pertains to information that is designated for retrieval in a bulk transfer mode in which a bulk quantity information is retrieved as a whole, not in multiple parts on an on-needed piecemeal basis, and wherein the first type of information pertains to audio game information, and the second type of information pertains to game level load information;

wherein the logic for retrieving the requested information from said one cache segment further comprises;

logic configured to move a pointer associated with said one cache segment ahead to define free cache space;

logic configured to pre-fetch information from the optical storage medium; and logic configured to store the pre-fetched information in the free cache space of said one cache segment.

12. The apparatus according to claim 11, wherein the retrieved information pertains to a game application.

13. The apparatus according to claim 11, wherein the first type of information pertains to audio game information, and the second type of information pertains to game level load information.

14. The apparatus according to claim 11, wherein the logic for determining is configured to determine whether the requested information is stored in a cache segment identified in hint information received from a host system.

15. The apparatus according to claim 11, wherein the logic for pre-fetching is configured to operate at a time in which a drive mechanism is not otherwise engaged performing other tasks.

16. The apparatus according to claim 11, wherein the logic for filling is configured to fill said one cache segment in a circular manner by wrapping around from an end of said one cache segment to a beginning of said one cache segment.

17. The apparatus according to claim 11, wherein the logic for retrieving the requested information from the optical storage medium further comprises:

logic configured to determine which one of the cache segments should receive the requested information based on an eviction algorithm;

logic configured to flush the determined cache segment of its current contents; and logic configured to store the information retrieved from the optical storage medium in the determined cache segment.

18. The apparatus according to claim 17, wherein the eviction algorithm determines the cache segment to receive the requested information by identifying the cache segment which has been least recently used.

19. The apparatus according to claim 17, wherein the eviction algorithm determines the cache segment to receive the requested information by identifying the cache segment which has been least frequently used.

20. A computer readable storage medium including machine readable information for implementing on a computing device, that when executed, perform the cache memory and the logic recited in claim 11.

* * * * *

UNITED STATES PATENT AND TRADEMARK OFFICE
CERTIFICATE OF CORRECTION

| | | |
|---|---|---|
| PATENT NO. | : 7,337,273 B2 | Page 1 of 1 |
| APPLICATION NO. | : 10/817308 | |
| DATED | : February 26, 2008 | |
| INVENTOR(S) | : Brian L. Schmidt et al. | |

It is certified that error appears in the above-identified patent and that said Letters Patent is hereby corrected as shown below:

In column 19, line 54, in Claim 7, delete "executed" and insert -- executed, --, therefor.

In column 20, line 65, in Claim 11, delete "comprises;" and insert -- comprises: --, therefor.

Signed and Sealed this

Fifteenth Day of February, 2011

David J. Kappos
*Director of the United States Patent and Trademark Office*